Dec. 11, 1928.
E. E. LANDAHL
DRIVE AND CONVEYER CHAIN
Filed Nov. 19, 1923    2 Sheets-Sheet 1
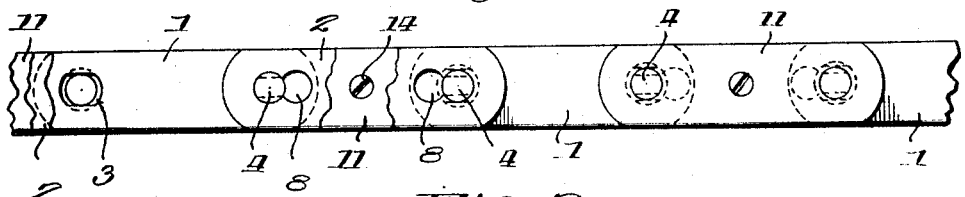
Fig. 1.
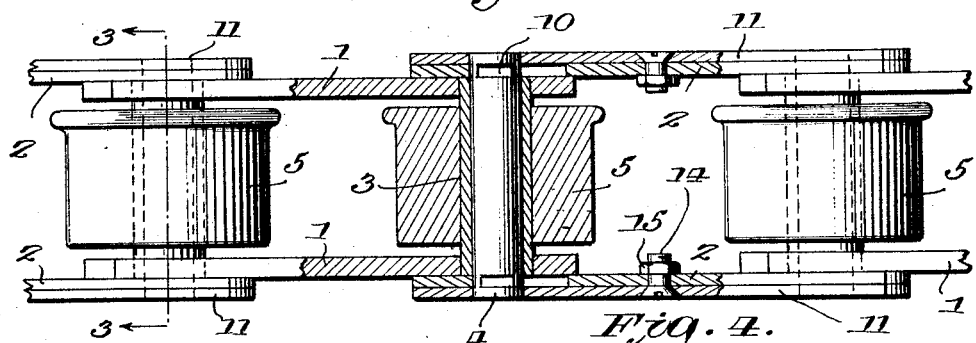
Fig. 2.
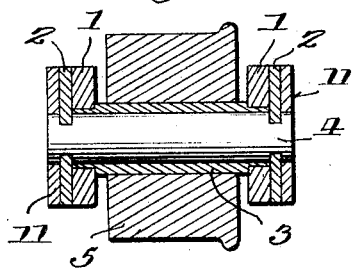
Fig. 3.
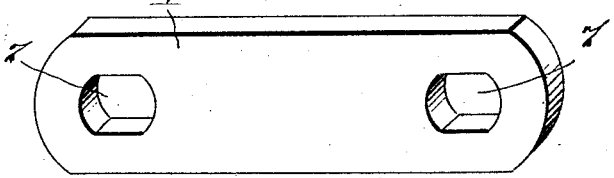
Fig. 4.
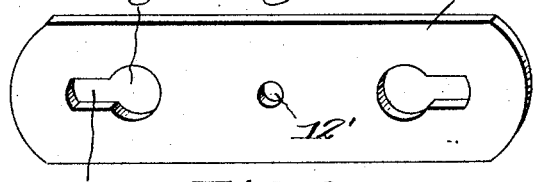
Fig. 5.
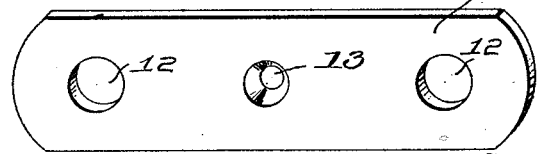
Fig. 6.
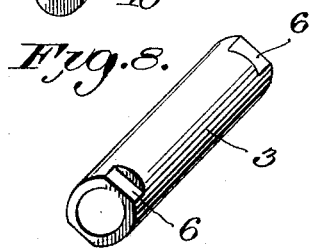
Fig. 7.
Fig. 8.
Inventor
E. E. Landahl,
By Steward & McKay
his Attorneys Dec. 11, 1928.  E. E. LANDAHL  1,694,746
DRIVE AND CONVEYER CHAIN
Filed Nov. 19, 1923  2 Sheets-Sheet 2
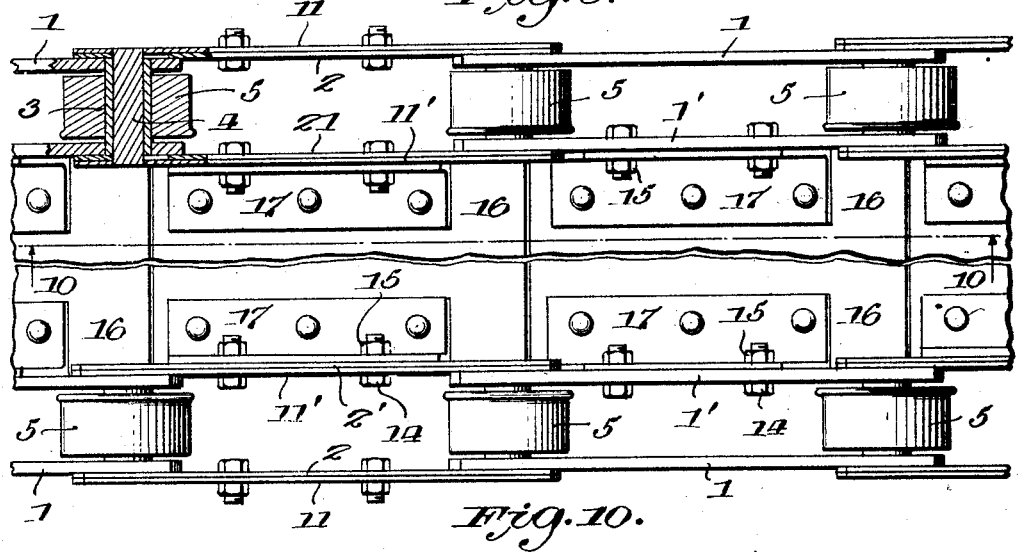
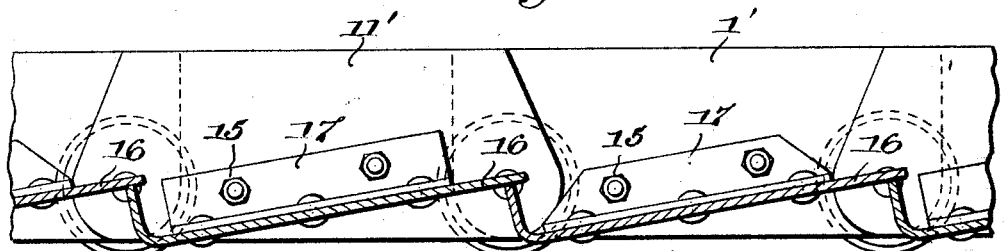
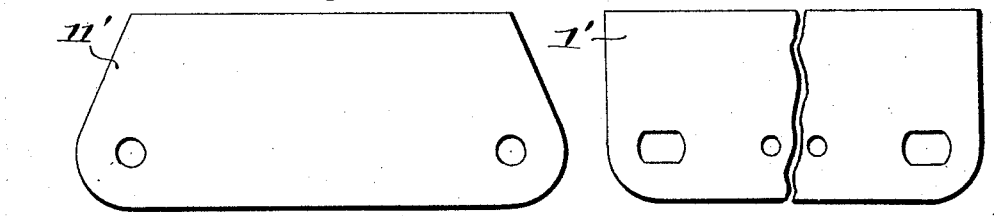
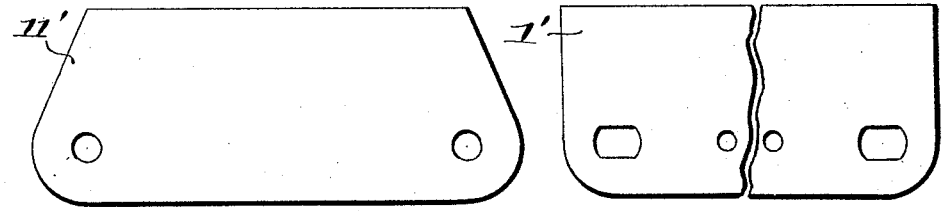
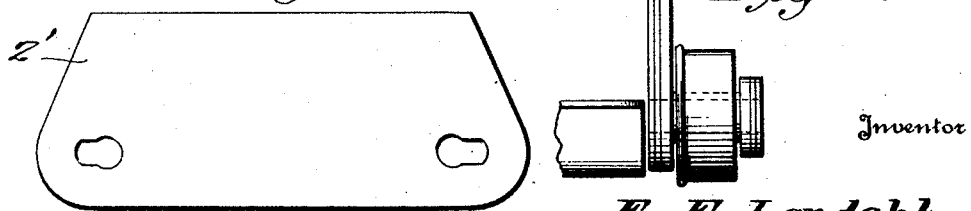
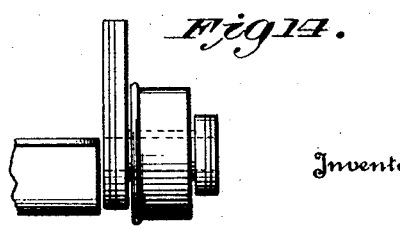
Inventor
E. E. Landahl,
By Heward & McKay
his Attorneys Patented Dec. 11, 1928.

1,694,746

UNITED STATES PATENT OFFICE.

EUGENE E. LANDAHL, OF CHICAGO, ILLINOIS.

DRIVE AND CONVEYER CHAIN.

Application filed November 19, 1923. Serial No. 675,761.

This invention relates to drive and conveyer chains; and it relates more particularly to drive and conveyer chains of the type wherein the links are formed of a series of pairs of opposed side bars or links connected by pintles, the latter generally serving also as supports or axles for wheels or rollers.

A well known and desirable feature in chains of the type referred to is the provision of detachably connected links so constructed that the chain may be readily separated at any point or wholly or partially disassembled by certain relative movements of the links and their connecting hinge pins or pintles. In chains having this desirable feature of separability of parts, however, provision must be made for locking the parts from unintended separating movement during the normal use of the chain. In the prior art, so far as I am aware, the structural elements or devices employed to lock the parts from the separating movement referred to, have been purely accessory structures in the chain, contributing no other advantageous features thereto such as increased strength or distribution of the stresses to which the chain as a whole is subjected in use.

An object of my invention is to provide a chain constructed of a series of parts separable in the manner referred to and having keeper-means locking the parts from separating movement during the normal use of the chain and at the same time functioning as structural elements of the chain itself to impart increased strength thereto and to more uniformly distribute the stresses to which the chain is subjected in use.

Another object of my invention is to provide a chain having the advantageous features referred to which, on the one hand, may be employed as a drive chain only, that is, solely as a part of gearing to transmit motion from a driving to a driven shaft or the like; but which, on the other hand, is also adapted for use as a conveyer chain, that is as the drving-chain element in a conveyer structure.

The foregoing and other objects and the principles of the invention will more fully appear from the concrete embodiment of the invention hereinafter described and shown in the accompanying drawings. It is to be understood, however, that the particular embodiment referred to is merely illustrative of the invention and that various other embodiments may be made within the broad scope of the invention and as defined in the appended claims.

In the accompanying drawings forming a part of this specification:

Fig. 1 represents a side view of a portion of a chain embodying my invention, with certain of the outer link elements broken away to expose in side view the end portions of certain overlapped link elements;

Fig. 2 is a view partly in plan and partly in horizontal section of a portion of the same chain;

Fig. 3 is a transverse sectional view, with the section taken on the line 3—3 of Fig. 2;

Figs. 4, 5 and 6 are perspective views of three different link elements all employed in the chain;

Fig. 7 is a perspective view of the connecting pintle employed;

Fig. 8 is a perspective view of a sleeve element employed about the pintle in the assembled chain;

Fig. 9 is a plan view, partly sectioned, of a portion of the chain and carrier units of a conveyer, illustrating the adaptation of my improved chain to a conveyer, and showing the use of the chain as the supporting and driving element for the carrier units of the conveyer;

Fig. 10 is a vertical longitudinal section, on the line 10—10 of Fig. 9, through the conveyer structure shown in Fig. 9;

Figs. 11, 12 and 13 are side elevational views of modified forms of link elements particularly adapting the chain for use in the conveyer structure shown in Figs. 9, and 10; and Fig. 14 is a partial end view of the conveyer structure shown in Figs. 9 and 10.

Figs. 9 to 14 inclusive are on a scale somewhat reduced from the scale employed in Figs. 1 to 8 inclusive.

In the concrete examples given, my invention is embodied in that particular and well known class or type of drive chains having central links pivoted to hinge-pins or pintles which are held in the ends of connecting detachable side links, the side links having keyhole slots and the ends of the pins or pintles being fashioned to permit their insertion at the larger end of the slot in the assembly of the chain and their movement to their normal location of use in the smaller end of the slot. My invention contemplates additional structural elements in such a chain, functioning to retain the pins or pintles in their normal location of use in the side links referred to and also to form, in association with the other elements of the chain, a new structural assembly substantially strengthening the chains and more uniformly distributing the stress to which it is subjected.

Referring more particularly to Figs. 1 to 8 inclusive, the central links of the chain are indicated at 1, and the connecting side links are indicated at 2, both being arranged in pairs of opposed links in the assembled chain, as shown particularly in Fig. 2.

The central links 1 of each pair are apertured adjacent their ends for the mounting of the sleeves 3 uniting the opposed links, and through which sleeves the hinge pins or pintles 4 are extended, and upon which sleeves rollers may be journaled, flanged rollers 5 being here shown. The sleeves 3 are non-rotatively mounted in the central links 1, the outer cylindrical surface of each sleeve being slabbed off from its ends inwardly on opposite sides a distance equal to the thickness of the links 1 to form end portions 6 engaging in the apertures 7 in the links 1 which apertures are formed with opposite curved and straight edges to engage the curved and plane faces of the end portions 6 of the sleeves.

Each side-link 2 is provided adjacent its ends with keyhole slots formed of inwardly disposed circular holes 8 and reduced slots 9 extending therefrom toward the ends of the link. The hinge-pins or pintles 4, cylindrical in form, are of a length to extend beyond the ends of the sleeve 3 and of a diameter to enter the holes 8 in the side-links 2, each pin being formed adjacent its ends with neck portions 10 having opposite plane surfaces and reduced to the width of the slots 9 of the side-links, so that when the ends of the pin are entered through the holes 8 of the side-link and the pin is turned to bring the necks 10 into alinement with the slots 9, the pin may be mounted with the neck portions within the slots in the side links and thus be held from endwise and from rotative movements in those links.

The assembly thus far described is a typical structure of a well known form of chain in which my invention, in the illustrated example, is shown as embodied. When such a chain is assembled, it is apparent that the spaced pairs of central links alternate with a pair of side links throughout the chain, and that in the normal use of the chain the hinge-pins or pintles are spread apart along each pair of side-links a distance determined by the engagement of their neck portions with the ends of the slots in those links. To detach the central links from the connecting side links, so as to separate the chain at any point, the chain is slackened to permit relative movement along its length of the pivotal pins and side links in order that the pins may be advanced toward the center of the side links for the freeing of their neck portions from the slots and the withdrawal of the pintles endwise through the circular holes of the inner ends of the slots.

A defect in such chains has been a tendency of their parts to separate during the normal use of the chain by accidental or unintended relative movement of the side links and pintles. Another defect has been a reduction in the tensile strength of the chain as a whole partly by reason of the weakening of the side links due to the relatively extended keyhole slot required and partly by reason of the unequal distribution of the stresses to which the chain is subjected, due to the relatively limited bearing surface of the pintles in the side links.

As already stated, my invention contemplates the provision in a chain of the type thus far described of means locking the parts from separating movement during the normal use of the chain and at the same time functioning as structural elements of the chain itself in association with the other elements of the chain to impart increased strength thereto and to more uniformly distribute the stresses to which the chain is subjected in use.

In the present illustrative embodiment of the invention, the means referred to comprises keeper-plates 11 in the form of bars of a length to span any two adjacent pintles when in their spread condition in the chain as assembled for use. The cylindrical end portions of the pintles are extended beyond the outer side-links 2 and the keeper plates 11 are provided with circular apertures 12 adjacent their ends to snugly fit about the extended end portions of the pintles, as shown particularly in Figs. 2, 3 and 6.

The keeper plates 11 are disposed in pairs against the side links 2, each plate mounted over the end portions of the adjacent pintles 4 extending through a side link 2 and bearing against the outer face of the side link. Any suitable means may be provided for rigidly but removably securing the keeper-plates 11 to the side-links 2. In the illustrative example, the side-links 2 and the keeper-plates 11 are centrally apertured as indicated at 12' and 13, and the parts are secured together by a screw bolt 14, extending through the apertures and a nut 15 upon the bolt. When the chain is of relatively short pitch, as is the chain illustrated in Figs. 1 and 2, but one such securing means for each keeper-plate and side-link need be employed, two or more being desirable in chains of longer pitch.

It is apparent from the arrangement of parts described, that the double side-bars or keeper plates 11 maintain the pintles extending through each pair of side links 2 in spaced relation, so that there is no possibility of relative movement of parts in the use of the chain advancing the pintles along the side links 2 to releasing position. It is also apparent that the side bars or keeper plates 11 function as additional link elements in the chain substantially reinforcing the side-links 4 and presenting additional bearing surfaces for the pintles 2, thus more uniformly distributing the stresses to which the chain is subjected and in particular taking some of the stresses from the side links 2 and the neck portions of the pintles engaged in the slots therein.

Figs. 9 to 14 inclusive illustrate my improved chain when employed as the driving and supporting chain element of a conveyer. Two strands of the chain are employed, one on each side of the carrier units of the conveyer, as shown in Fig. 9, and the carrier units are supported in intermediate position from the side strands of the chain. In such use of the chain, the support of any carrier units from the side-links 2 of the chain would impose an added strain upon these side-links which, without the reinforcing side-bars or keeper plates of my invention, could not be borne.

In the employment of the chain as the driving and supporting element of a conveyer, as shown in Figs. 9 and 14 particularly, the central links 1, the side links 2 and the side bars or keeper-plates 11, on the outer side of each strand of the chain, that is on the side remote from the carrier units, are of the conformation already described. In the type of conveyer structure here shown, however, the corresponding parts of the chain adjacent the carrier units are preferably increased in width and modified in contour to provide side walls for the carrier units, the modified forms of central link, side link and keeper-plate being indicated at 1′, 2′, and 11′ respectively, in Figs. 11, 12 and 13.

As shown in Figs. 9 and 10, the conveyer comprises a series of carrier units extending along the series of chain elements, each carrier unit consisting of a bottom plate or apron 16 supported from the chain by angle plates or brackets 17, the brackets having a laterally extending portion bolted to the apron and a vertically extending portion bolted to the adjacent side elements of the chain. The brackets for the carrier units alined with the side-links 2′ and plates 11′ of the chain are removably attached to those parts by screw bolts 14 and securing nuts 15, as shown particularly in Fig. 9, the bolts and nuts serving also to rigidly attach the bar 11′ in mounted position over the pintles and against the side-links 2′. The brackets for the carrier units alined with the central links 1′ are likewise removably secured to those links by screw bolts 14 and nuts 15.

What is claimed is:

1. A separable drive or conveyer chain comprising, in combination, central and side links and pintles pivotally connecting said central and side links together, said side links having slots through which said pintles are extended, and outer rigid side bars rigidly but detachably mounted on said side links and each apertured to closely engage entirely around the end portions of two adjacent pintles in a manner to provide a close bearing surface for said pintles entirely around their said outer end portions and thereby to maintain said pintles in spread position in bearing contact with said side links at the ends of the slots therein and to take from said side links a portion of the stress in the use of said chain.

2. A separable drive or conveyer chain comprising, in combination, central and side links hinged together by pintles, said side links having key-hole slots and said pintles having reduced neck portions engaging in the ends of said slots in the working assembly of the parts of said chain and end portions extending outwardly of said side links, and outer rigid side bars, each rigidly mounted and apertured to closely engage entirely around the end portions of two adjacent pintles to maintain said pintles in spread position in bearing contact with said side links at the ends of said slots and to form additional rigid links of said chain between adjacent pintles taking from said side links a portion of the stress in the use of said chain.

3. A separable drive or conveyer chain comprising, in combination, central and side links alternating throughout the chain and with said side links in pairs with the links of each pair disposed at opposite sides of said center links, pintles pivotally connecting said side links to said center links, said pintles being formed with reduced neck portions and each of said side links being formed with a pair of key hole slots receiving the end portions of a pair of pintles and permitting the spread of the pintles of each pair to the ends of said slots in the working assembly of the parts of said chain and the approach of the pintles of each pair to separate said chain, and a pair of rigid outer links for each pair of side links removably secured against the outer sides of said side links and closely engaging entirely around the end portions of said pintles in a manner to provide a close bearing surface for said pintles entirely around their said end portions, to maintain said pintles in spread position in bearing contact with said side links at the ends of the slots therein, and whereby stress in the use of said chain is divided between said side links and said outer links.

4. In a separable chain of the class described, in combination, a plurality of pairs of opposite-side or double links each engaging a pair of adjacent pintles of the chain and each link of each pair having a keyhole slot receiving the end portion of one pintle of the pair, said keyhole slots providing for the relative spread of the pintles of each pair a distance determined by the engagement of a pintle against the end of the slot in the working assembly of the parts of said chain and permitting relative approach of the pintles of each pair to separate said chain, and double rigid side bars removably mounted on the outer faces of said double links, each side bar engaging closely entirely around the outer ends of the two pintles of a pair in a manner to provide a close bearing surface for the outer ends of said pintles entirely therearound and thereby to maintain said pintles in their spread condition and to take from said links a portion of the stress in the use of said chain.

5. A separable drive or conveyer chain comprising, in combination, alternating central and side links and pintles for connecting said central and side links together, said central links and pintles being cooperatively formed to promote a pivotal connection between them with a pair of pintles extending through each central link, said side links and the outer extending end portions of said pintles being cooperatively formed and arranged to dispose said end portions of a pair of pintles through each side link in a manner preventing rotative movement of said pintles in said side links when the chain is assembled for use but enabling disconnection of said side links and pintles by relative approaching movement of the pintles of each pair longitudinally of its side link, and outer removable rigid side bars each closely engaging entirely around the end portions of two adjacent pintles to restrain said pintles from said approaching movement and to provide an additional bearing for said pintles and link member for said chain.

In testimony whereof I hereunto affix my signature.

EUGENE E. LANDAHL.